(12) United States Patent
Yang et al.

(10) Patent No.: US 12,255,294 B1
(45) Date of Patent: Mar. 18, 2025

(54) VOLTAGE DROP CIRCUIT ASSEMBLY OF LITHIUM BATTERY AND 1.5V LITHIUM BATTERY

(71) Applicant: Hamedata Technology Co., Limited, Guangdong (CN)

(72) Inventors: Changjun Yang, Guangdong (CN); Pengfei Xiao, Guangdong (CN); Jian Zhao, Guangdong (CN); Wei Zhou, Guangdong (CN); Qiang Hou, Guangdong (CN)

(73) Assignee: Hamedata Technology Co., Limited, Guangdong (CN)

( * ) Notice: Subject to any disclaimer, the term of this patent is extended or adjusted under 35 U.S.C. 154(b) by 0 days.

(21) Appl. No.: 18/783,548

(22) Filed: Jul. 25, 2024

Related U.S. Application Data

(63) Continuation of application No. PCT/CN2024/096517, filed on May 31, 2024.

(30) Foreign Application Priority Data

Feb. 2, 2024 (CN) .......................... 202420272216.2

(51) Int. Cl.
*H01M 50/284* (2021.01)
*H01M 10/0587* (2010.01)
(Continued)

(52) U.S. Cl.
CPC ... *H01M 10/4257* (2013.01); *H01M 10/0587* (2013.01); *H01M 10/0525* (2013.01); *H01M 2010/4271* (2013.01)

(58) Field of Classification Search
None
See application file for complete search history.

(56) References Cited

U.S. PATENT DOCUMENTS

| 2018/0069273 A1 | 3/2018 | Zhang et al. |
| 2021/0408809 A1 | 12/2021 | Liu et al. |
| 2022/0252231 A1 | 8/2022 | Wang |

FOREIGN PATENT DOCUMENTS

| CN | 203787480 U | 8/2014 |
| CN | 204966611 U | 1/2016 |

(Continued)

OTHER PUBLICATIONS

Non-Final Office Action received in U.S. Appl. No. 18/783,578, mailed Nov. 12, 2024, 13 pages.

(Continued)

*Primary Examiner* — Lucas J. O'Donnell
(74) *Attorney, Agent, or Firm* — Cooper Legal Group, LLC

(57) ABSTRACT

The present application relates to a voltage drop circuit assembly of a lithium battery and a 1.5V lithium battery. The voltage drop circuit assembly includes a PCB, an outer conductive cap and an inner conductive cap, a front surface of the PCB is provided with a positive copper ring and a negative copper ring, the positive copper ring is electrically connected with the outer conductive cap, the outer conductive cap is used as a low-voltage output positive electrode, the negative copper ring is used as a common negative electrode, a back surface of the PCB is provided with a high-voltage input copper ring, the high-voltage input copper ring is electrically connected with the inner conductive cap, and the inner conductive cap is used as a high-voltage input positive electrode.

8 Claims, 5 Drawing Sheets

(51) Int. Cl.
*H01M 10/42* (2006.01)
*H01M 10/0525* (2010.01)

(56) References Cited

FOREIGN PATENT DOCUMENTS

| CN | 205985094 U | | 2/2017 | | |
|----|-------------|---|--------|---|---|
| CN | 106486693 A | | 3/2017 | | |
| CN | 107968161 A | | 4/2018 | | |
| CN | 210224208 U | | 3/2020 | | |
| CN | 112201839 A | * | 1/2021 | ......... | H01M 10/052 |
| CN | 214477625 U | | 10/2021 | | |
| CN | 113659256 A | | 11/2021 | | |
| CN | 216413143 U | | 4/2022 | | |
| CN | 116799335 A | | 9/2023 | | |
| CN | 117673498 A | | 3/2024 | | |
| CN | 117855628 A | | 4/2024 | | |
| JP | 59-067856 U | | 5/1984 | | |
| JP | 2007194129 A | | 8/2007 | | |
| JP | 2012146766 A | | 8/2012 | | |
| JP | 2018056075 A | | 4/2018 | | |
| JP | 2018160439 A | | 10/2018 | | |
| WO | 2023085030 A1 | | 5/2023 | | |

OTHER PUBLICATIONS

Office Action received in Japanese Patent Application No. 2024-113515, dated Oct. 22, 2024, 10 pages.
International Search Report received in International Patent Application No. PCT/CN2024/096517, mailed Sep. 24, 2024, 5 pages.
International Search Report received in International Patent Application No. PCT/CN2024/096456, mailed Oct. 9, 2024, 3 pages.

* cited by examiner

VOLTAGE DROP CIRCUIT ASSEMBLY OF LITHIUM BATTERY AND 1.5V LITHIUM BATTERY

CROSS-REFERENCE TO RELATED APPLICATIONS

The present application is a continuation of PCT application serial no. PCT/CN2024/096517, filed on May 31, 2024, which claims the priority benefits of China patent application No. 202420272216.2, filed on Feb. 2, 2024. The entireties of PCT application serial no. PCT/CN2024/096517 and China patent application No. 202420272216.2 are hereby incorporated by reference herein and made a part of this specification.

FIELD OF THE INVENTION

The present application relates to the field of lithium battery technologies, and in particular, to a voltage drop circuit assembly of a lithium battery and a 1.5V lithium battery.

BACKGROUND OF THE INVENTION

An AA battery and an AAA battery are very common batteries, widely applicable to various devices, such as remote controllers, electric toys, electric toothbrushes, shavers, wireless microphones, doorbells, or the like. Generally, they are disposable dry batteries, or rechargeable nickel-metal hydride batteries, which, however, suffer from the defects of a memory effect, less rechargeable times and short service life, and thus have relatively limited practical applications.

A lithium battery has the advantages of no memory effect, high energy density and long service life, but a lithium cell has a voltage of generally 3.0-4.2V, and thus cannot be directly applied to various existing devices even if the lithium battery is made into the AA battery or the AAA battery. Therefore, a lithium battery capable of reducing a voltage is proposed, in which the output voltage is reduced to 1.5V to improve the universality of the battery. It can replace the existing disposable battery and the existing nickel-metal hydride battery, having a wide application prospect.

For example, Chinese Patent Application No. CN203787480U titled "Variable-Voltage Cylindrical Battery Apparatus" discloses a low-voltage lithium battery, which changes a high voltage of a lithium battery into a low voltage of 1.5V through a voltage drop circuit board. Chinese Patent Application No. CN204966611U titled "1.5V Constant-Voltage Lithium Ion Battery" discloses a voltage drop circuit capable of constantly outputting a low voltage of 1.5V and achieving charge and discharge functions at a same terminal. However, the above prior arts fail disclose a detailed internal structure, and the contents that have been disclosed are not reasonable enough. Since the AA battery and the AAA battery have small sizes, it is very critical to design a voltage drop circuit assembly, reasonably arrange the voltage drop circuit assembly inside the lithium battery, and electrically connect the voltage drop circuit assembly with a lithium battery core. There is still a room for improvement.

SUMMARY

In order to solve the technical problem that an internal structure of an existing lithium battery is not reasonable enough, the present invention provides a voltage drop circuit assembly of a lithium battery and a 1.5V lithium battery.

In an aspect, the present application provides a voltage drop circuit assembly of a lithium battery, including a PCB, wherein a voltage drop circuit, a charging and discharging circuit and a protection circuit are integrated on the PCB, the voltage drop circuit assembly further includes an outer conductive cap and an inner conductive cap, a front surface of the PCB is provided with a positive copper ring and a negative copper ring, the positive copper ring is electrically connected with the outer conductive cap, the outer conductive cap is used as a low-voltage output positive electrode, the negative copper ring is used as a common negative electrode, a back surface of the PCB is provided with a high-voltage input copper ring, the high-voltage input copper ring is electrically connected with the inner conductive cap, and the inner conductive cap is used as a high-voltage input positive electrode.

By adopting the above technical solution, existing necessary circuits, such as the voltage drop circuit, a voltage stabilizing circuit, a charging circuit, the over-discharge protection circuit, or the like, may be adopted on the PCB in the present application, a circuit principle is not required to be greatly improved, but a structure is greatly improved; that is, the positive copper ring, the negative copper ring and the high-voltage input copper ring are arranged on the PCB, the positive copper ring is used as the low-voltage output positive electrode, the high-voltage input copper ring is used as the high-voltage input positive electrode, the negative copper ring is used as the common negative electrode, and high-voltage input and low-voltage output functions are achieved through the three copper rings; the high-voltage input copper ring is electrically connected with the inner conductive cap and used as the high-voltage input positive electrode, the positive copper ring is electrically connected with the outer conductive cap, the outer conductive cap is used as the output positive electrode of the lithium battery, the negative copper ring is electrically connected with a metal housing of the lithium battery and used as an output negative electrode of the lithium battery, a same-port charge and discharge function is achieved, conductive cables are avoided, stability of an electrical performance is higher, an internal connection structure of the lithium battery is simplified, and safety is higher.

Preferably, the outer conductive cap and the inner conductive cap are both patch welded on the PCB.

Preferably, electronic elements on the PCB are centrally arranged in the outer conductive cap and the inner conductive cap.

Preferably, the electronic elements located in the outer conductive cap include a capacitor, an inductor and a resistor, and the electronic element located in the inner conductive cap is a three-in-one chip.

Preferably, a lower end of the outer conductive cap is provided with a flange edge.

Preferably, the voltage drop circuit assembly further includes an elastic ring, and the elastic ring is electrically connected with the negative copper ring.

Preferably, the elastic ring includes a base ring and fins uniformly distributed on a periphery of the base ring, and a back surface of the base ring is welded on the negative copper ring by a patch.

In another aspect, the present application provides a 1.5V lithium battery, including a metal housing, a PVC sheath, a wound battery core assembly and the above voltage drop circuit assembly of a lithium battery, wherein the wound battery core assembly and the voltage drop circuit assembly are arranged in the metal housing, a positive tab of the wound battery core assembly is welded on the inner conductive cap, a negative tab of the wound battery core assembly is welded at a bottom of the metal housing, the elastic ring elastically abuts against the metal housing, and the PVC sheath is configured to wrap the metal housing.

In summary, the present application can achieve at least one of the following beneficial effects.

1. In the present application, the outer conductive cap and the inner conductive cap are provided, and the positive copper ring, the negative copper ring and the high-voltage input copper ring are arranged on the PCB, eliminating the need of the conductive cables, while achieving more stable electrical performance; and 2. The internal structure of the lithium battery according to the present application is simplified, and the internal connection structure is more reliable and safer.

DETAILED DESCRIPTION

Figure 1:
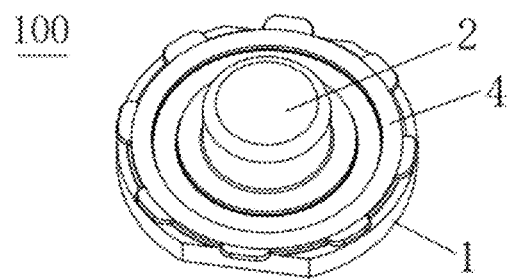
FIG. 1 is a front perspective view of a voltage drop circuit assembly according to an embodiment of the present application.
Figure 2:
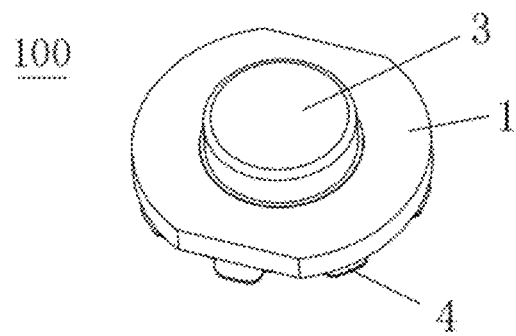
FIG. 2 is a back perspective view of a voltage drop circuit assembly according to an embodiment of the present application.

The present application is described in further detail below with reference to FIGS. 1 to 9.

Referring to FIGS. 1 to 4, an embodiment of the present application discloses a voltage drop circuit assembly 100 of a lithium battery, including a printed circuit board (PCB) 1. A voltage drop circuit, a charging and discharging circuit and a protection circuit are integrated on the PCB 1. The voltage drop circuit assembly 100 further includes an outer conductive cap 2 and an inner conductive cap 3. A front surface of the PCB 1 is provided with a positive copper ring 11 and a negative copper ring 12, the positive copper ring 11 is electrically connected with the outer conductive cap 2, the outer conductive cap 2 is used as a low-voltage output positive electrode, and the negative copper ring 12 is used as a common negative electrode. A back surface of the PCB 1 is provided with a high-voltage input copper ring 13, the high-voltage input copper ring 13 is electrically connected with the inner conductive cap 3, and the inner conductive cap 3 is used as a high-voltage input positive electrode.

Figure 3:
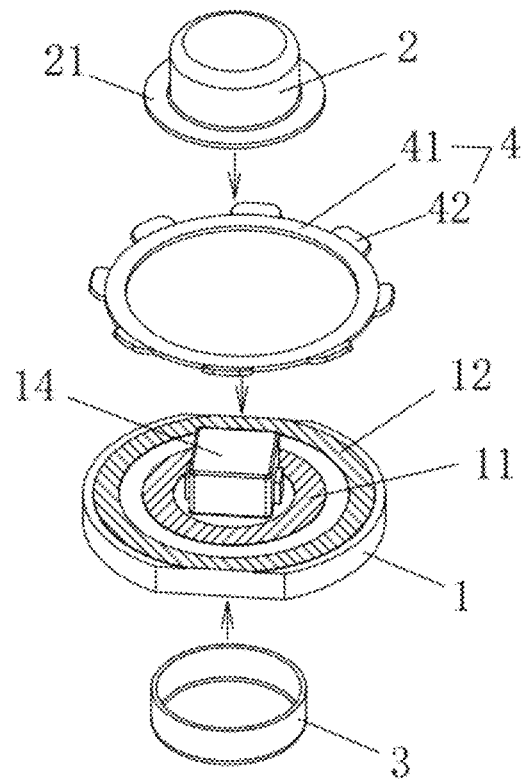
FIG. 3 is a schematic half-section diagram of a voltage drop circuit assembly according to an embodiment of the present application.
Figure 4:
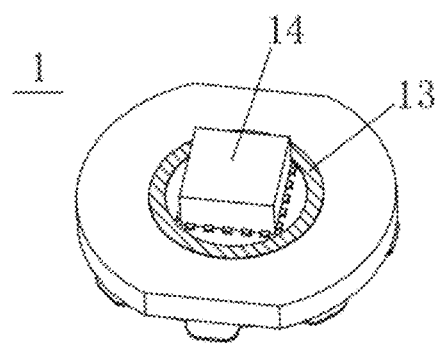
FIG. 4 is a back perspective view of a PCB according to an embodiment the present application.
Figure 5:
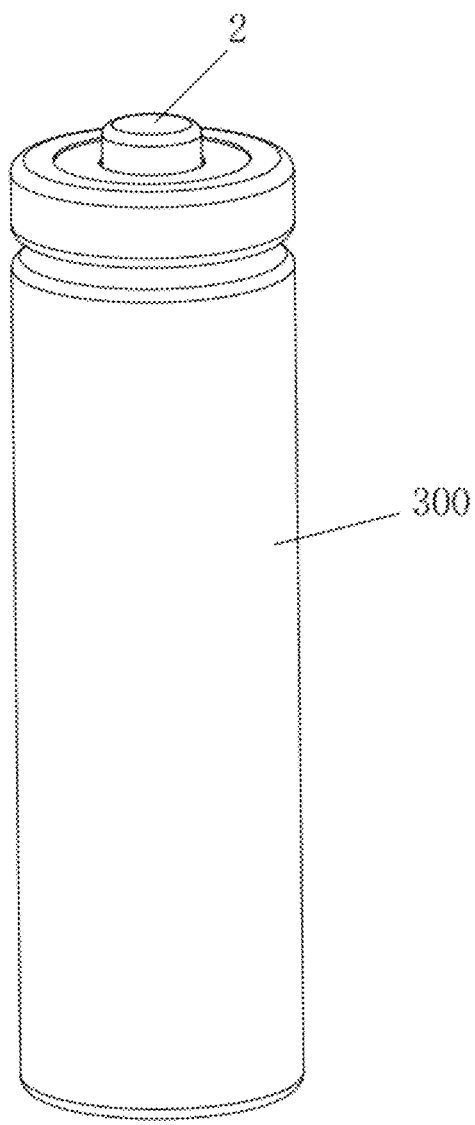
FIG. 5 is a perspective view of a 1.5V lithium battery according to an embodiment of the present application.
Figure 6:
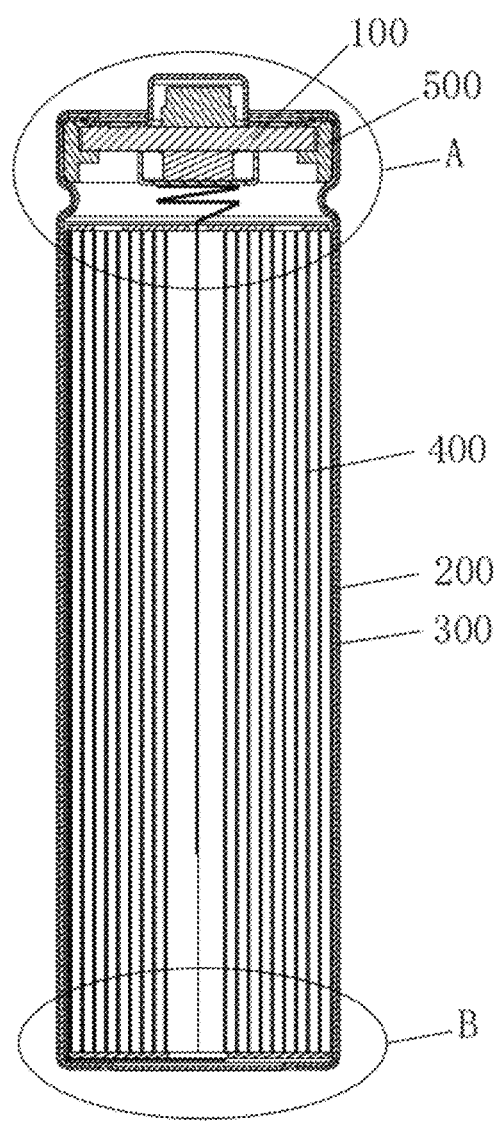
FIG. 6 is a schematic half-section diagram of a 1.5V lithium battery according to an embodiment of the present application.
Figure 7:
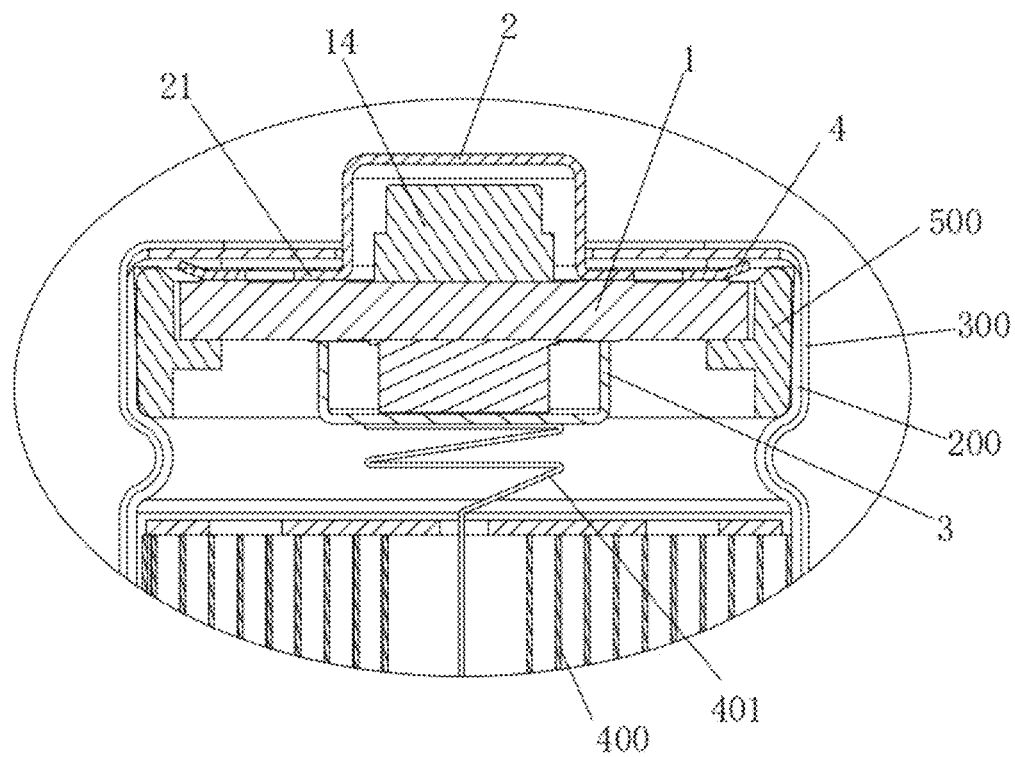
FIG. 7 is an enlarged view of Portion A in FIG. 6.
Figure 8:
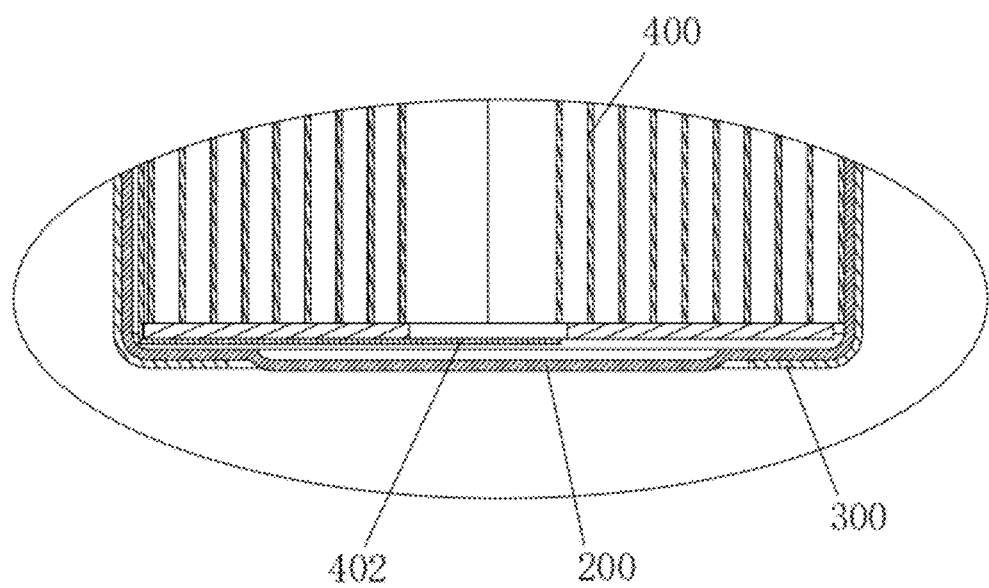
FIG. 8 is an enlarged view of Portion B in FIG. 6.
Figure 9:
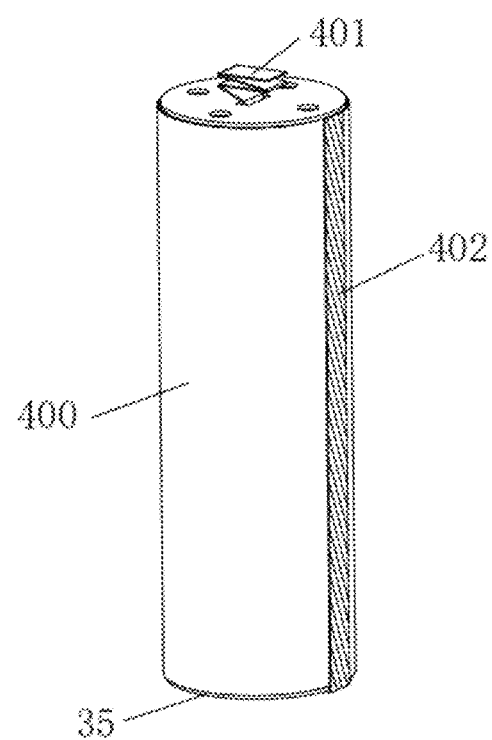
FIG. 9 is a perspective view of a wound battery core assembly according to an embodiment the present application.

Referring to FIG. 3, the outer conductive cap 2 and the inner conductive cap 3 are both patch welded on the PCB 1. Electronic elements 14 on the PCB 1 are centrally arranged in the outer conductive cap 2 and the inner conductive cap 3. The electronic elements 14 are arranged reasonably, and inner spaces of the outer conductive cap 2 and the inner conductive cap 3 are fully used. The electronic elements 14 located in the outer conductive cap 2 include a capacitor, an inductor and a resistor, the electronic element 14 located in the inner conductive cap 3 is a three-in-one chip which belongs to the prior art and has the advantages of a high integration level and a small volume, so that the PCB 1 is easier to design. The outer conductive cap 2 and the inner conductive cap 3 have good connection strength, reliable fixation, small resistance at a junction, good conductivity, and relatively good sealing performance, prevent water and dust res, and thus protect the internal electronic element 14, and the electronic element 14 cannot be in contact with the outside and cannot be damaged by collision. Since the outer conductive cap 2 is exposed, the outer conductive cap is prone to be impacted externally and required to be enhanced by fixed strength, and thus, a flange edge 21 is arranged at a lower end of the outer conductive cap 2, and the flange edge 21 has a certain width which is several times of a wall thickness of the outer conductive cap 2, an area of welding to the positive copper ring 11 is large, and fixation is firm and resistant to an impact. The inner conductive cap 3 is not exposed and not subjected to an external impact, and has a slightly low strength requirement, eliminating the need of a flange edge.

Referring to FIGS. 1 and 3, the voltage drop circuit assembly 100 further includes an elastic ring 4, and the elastic ring 4 is electrically connected with the negative copper ring 12. The elastic ring 4 includes a base ring 41 and fins 42 uniformly distributed on a periphery of the base ring 41, and a back surface of the base ring 41 is patch welded on the negative copper ring 12.

Existing necessary circuits, such as the voltage drop circuit, a voltage stabilizing circuit, a charging circuit, the over-discharge protection circuit, or the like, may be adopted on the PCB 1 in the present application, a circuit principle is not required to be greatly improved, but a structure is greatly improved. The positive copper ring 11, the negative copper ring 12 and the high-voltage input copper ring 13 are arranged on the PCB 1, the positive copper ring 11 is used as the low-voltage output positive electrode, the high-voltage input copper ring 13 is used as the high-voltage input positive electrode, the negative copper ring 12 is used as the common negative electrode, and high-voltage input and low-voltage output functions are achieved through the three copper rings. The high-voltage input copper ring 13 is electrically connected with the inner conductive cap 3 and used as the high-voltage input positive electrode, the positive copper ring 11 is electrically connected with the outer conductive cap 2, the outer conductive cap 2 is used as the output positive electrode of the lithium battery, the negative copper ring 12 is electrically connected with a metal housing 200 of the lithium battery and used as an output negative electrode of the lithium battery, charge and discharge functions at a same terminal is achieved, conductive cables are avoided, stability of an electrical performance is higher, an internal connection structure of the lithium battery is simplified, and safety is higher.

Referring to FIGS. 5 to 9, an embodiment of the present application discloses a 1.5V lithium battery, including a metal housing 200, a polyvinyl chloride (PVC) sheath 300, a wound battery core assembly 400, a plastic middle frame 500 and the above voltage drop circuit assembly 100 of a lithium battery, wherein the wound battery core assembly 400, the plastic middle frame 500 and the voltage drop circuit assembly 100 are arranged in the metal housing 200, the plastic middle frame 500 is configured to support the voltage drop circuit assembly 100, a positive tab 401 of the wound battery core assembly 400 is welded on the inner conductive cap 3, a negative tab 402 of the wound battery core assembly is welded at a bottom of the metal housing 200, the elastic ring 4 elastically abuts against the metal housing 200, and the PVC sheath 300 is configured to wrap the metal housing 200.

The positive tab 401 of the wound battery core assembly 400 is connected to the PCB 1 through the inner conductive cap 3 and the high-voltage input copper ring 13, the negative tab 402 of the wound battery core assembly 400 is connected to the PCB 1 through the metal housing 200, the elastic ring 4 and the negative copper ring 12, and after a voltage drop by the circuit on the PCB 1, the positive electrode of the lithium battery is output from the positive copper ring 11 and the outer conductive cap 2, and the negative electrode of the lithium battery is output from the negative copper ring 12, the elastic ring 4 and the metal housing 200.

The fins 42 of the elastic ring 4 are elastically pressed against the metal housing 200, and the elastic pressing can avoid the situation that pressing of the metal housing 200 and the negative copper ring 12 on the PCB 1 is not tight, or the negative copper ring 12 is crushed.

The above embodiments are preferred embodiments of the present application, and the protection scope of the present application is not limited thereby, and therefore, equivalent changes made according to the structure, shape and principle of the present application shall be covered by the protection scope of the present application.

LISTING OF REFERENCE SIGNS

1. PCB
2. Positive Copper Ring
12. Negative Copper Ring
13. High-Voltage Input Copper Ring
14. Electronic Element
2. Outer Conductive Cap
21. Flange Edge
3. Inner Conductive Cap
4. Elastic Ring
41. Base Ring
42. Fin
100. Voltage Drop Circuit Assembly
200. Metal Housing
300. PVC Sheath
400. Wound Battery Core Assembly
401. Positive Tab
402. Negative Tab
500. Plastic Middle Frame

What is claimed is:

1. A voltage drop circuit assembly of a lithium battery, comprising a printed circuit board (PCB), a voltage drop circuit, an outer conductive cap, and an inner conductive cap, wherein a charging and discharging circuit and a protection circuit are integrated on the PCB, a front surface of the PCB is provided with a positive copper ring and a negative copper ring, the positive copper ring is electrically connected with the outer conductive cap, the outer conductive cap is used as a low-voltage output positive electrode, the negative copper ring is used as a common negative electrode, a back surface of the PCB is provided with a high-voltage input copper ring, the high-voltage input copper ring is electrically connected with the inner conductive cap, and the inner conductive cap is used as a high-voltage input positive electrode.

2. The voltage drop circuit assembly of a lithium battery according to claim 1, wherein the outer conductive cap and the inner conductive cap are both patch welded on the PCB.

3. The voltage drop circuit assembly of a lithium battery according to claim 1, wherein electronic elements on the PCB are centrally arranged in the outer conductive cap and the inner conductive cap.

4. The voltage drop circuit assembly of a lithium battery according to claim 3, wherein the electronic elements located in the outer conductive cap comprise a capacitor, an inductor and a resistor, and the electronic element located in the inner conductive cap is a three-in-one chip.

5. The voltage drop circuit assembly of a lithium battery according to claim 2, wherein a lower end of the outer conductive cap is provided with a flange edge.

6. The voltage drop circuit assembly of a lithium battery according to claim 1, wherein the voltage drop circuit assembly further comprises an elastic ring, and the elastic ring is electrically connected with the negative copper ring.

7. The voltage drop circuit assembly of a lithium battery according to claim 6, wherein the elastic ring comprises a base ring and fins uniformly distributed on a periphery of the base ring, and a back surface of the base ring is patch welded on the negative copper ring.

8. A 1.5V lithium battery, comprising a metal housing, a polyvinyl chloride (PVC) sheath, a wound battery core assembly and the voltage drop circuit assembly of a lithium battery according to claim 6, wherein the wound battery core assembly and the voltage drop circuit assembly are arranged in the metal housing, a positive tab of the wound battery core assembly is welded on the inner conductive cap, a negative tab of the wound battery core assembly is welded at a bottom of the metal housing, the elastic ring elastically abuts against the metal housing, and the PVC sheath is configured to wrap the metal housing.

* * * * *